(12) United States Patent
Doh et al.

(10) Patent No.: US 7,280,754 B2
(45) Date of Patent: Oct. 9, 2007

(54) TWO-FIBER OPTICAL RING NETWORK

(75) Inventors: Sang-Hyun Doh, Hwasong-shi (KR); Ki-Cheol Lee, Suwon-shi (KR); Yun-Je Oh, Yongin-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 705 days.

(21) Appl. No.: 10/632,480

(22) Filed: Aug. 1, 2003

(65) Prior Publication Data

US 2004/0076426 A1    Apr. 22, 2004

(30) Foreign Application Priority Data

Oct. 16, 2002   (KR) ............... 10-2002-0063142

(51) Int. Cl.
*H04J 14/02* (2006.01)
(52) U.S. Cl. .......................... 398/4; 398/83
(58) Field of Classification Search .......... 398/4, 398/83–86
See application file for complete search history.

(56) References Cited

U.S. PATENT DOCUMENTS

| | | | |
|---|---|---|---|
| 5,647,035 A | 7/1997 | Cadeddu et al. ............ 385/24 |
| 6,222,653 B1 * | 4/2001 | Asahi ............................ 398/4 |
| 6,243,512 B1 | 6/2001 | Rettenberger et al. ........ 385/24 |
| 6,278,536 B1 | 8/2001 | Kai et al. ..................... 359/127 |
| 2002/0101633 A1 * | 8/2002 | Onaka et al. ................ 359/119 |

FOREIGN PATENT DOCUMENTS

| | | |
|---|---|---|
| CN | 1279548 | 1/2001 |
| CN | 1315093 | 9/2001 |
| EP | 0949777 A2 | 10/1999 |
| JP | 11-289296 | 10/1999 |
| JP | 2000-354006 | 12/2000 |
| WO | WO 00/35105 | 6/2000 |

* cited by examiner

*Primary Examiner*—Leslie Pascal
(74) *Attorney, Agent, or Firm*—Cha & Reiter, L.L.C.

(57) ABSTRACT

Disclosed is a two-fiber optical ring network having a plurality of nodes linked by first and second fiber optic links, wherein each node comprises a first splitting section for splitting optical signals from optical signals traveling through the first fiber into the protection channels; a first add/drop section for performing adding and/or dropping optical signals passing through the first splitting section to a plurality of channels; a first switching section for combining optical signals in the protection channels to the first fiber when there is no link failure between adjacent nodes and for combining optical signals in the protection channels to the second fiber when there is a link failure between adjacent nodes; and, a controlling section for identifying whether or not the optical link failure occurs in the fibers and for generating a control signal to activate a restoration process according to the identified outcome.

14 Claims, 4 Drawing Sheets

TWO-FIBER OPTICAL RING NETWORK

CLAIM OF PRIORITY

This application claims priority to an application entitled "Two-Fiber Optical Ring Network," filed in the Korean Intellectual Property Office on Oct. 16, 2002 and assigned Serial No. 2002-63142, the contents of which are hereby incorporated by reference.

BACKGROUND OF THE INVENTION

1. Field of the Invention

The present invention relates to an optical ring network and, in particular, to a configuration of nodes provided in an optical ring network.

2. Description of the Related Art

A recent explosive growth in the Internet traffic demands a higher bandwidth for all networks including the backbone of an optical network, which is based on a Wavelength-Division-Multiplexing (WDM) scheme. The optical ring network is a network topology that is attracting considerable attention due to its easy configuration, switching restoration, lower initial costs, and so forth, and it has been already adopted in many countries.

In general, an optical ring network must provide a full-mesh connectivity between all nodes that constitute the network. Currently, the optical ring network generally makes use of not only a multi-wavelength for WDM on the basis of two or four strands of optical fibers but also employs an approach where each pair of the nodes is connected to form optical paths. With an escalating growth in data traffic, the transmission capacity required for most networks is increasing, and a possibility of a shortage in transmission capacity is great. However, in terms of an efficiency of a metro network, a two-fiber network is expected to have a higher efficiency than a four-fiber network. For this reason, the two-fiber network is attracting more attention than the four-fiber network.

The optical ring network may be generally classified into two classes: a unidirectional-wavelength-path-switching ring (UWPSR) and a bidirectional-fiber-line-switching ring (BFLSR). However, both a UWPSR and a BFLSR require many optical channels to accomplish a full-mesh connectivity in the network. To overcome this problem, a bidirectional-wavelength-path-switching ring (BWPSR) has bas been introduced.

In a BWPSR, there is an advantage in that it is capable of performing a rapid restoration under the protection and restoration condition and comprises a simple configuration. However, there are some drawbacks in that a BWPSR limits the number of nodes that can be adapted, thus the whole transmission capacity of the network is reduced as an excessive number of optical channels must be connected to all the nodes. In addition, each optical fiber is provided with a wavelength-division multiplexer in which the number of ports corresponds to that of WDM channels, thus each node requires switches for as many channels as are added or dropped. Furthermore, during the switching mode, a BWPSR needs a longer time to perform the switching restoration operation.

In a BFLSR, there is an advantage in that a number of optical channels is less, but there are disadvantages in that it has poor compatibility with the existing equipments, such as a synchronous optical network (SONET), and the number of desired wavelengths is more than that of a BWPSR. Further, a BFLSR demands a large number of wavelength-division multiplexers, such as arrayed waveguide grating (AWG), for 32 ports when it makes use of 32 channels.

As such, in all the cases mentioned above, a wavelength-division multiplexer is required when the network has as many ports as WDM channels. In the field of a wavelength-division multiplexer, an increase in the port means that both the cost of a wavelength-division multiplexer and the number of components connected with each port are increased, thus increasing expenses for configuring each node.

SUMMARY OF THE INVENTION

The present invention overcomes the above-described problems, and provides additional advantages, by providing a two-fiber optical ring network capable of reducing expenses related to obtain each node configuration.

According to one aspect of the invention, a two-fiber optical ring network capable of making use of the bandwidths more efficiently than the conventional network is provided.

According to another aspect of the present invention, a two-fiber optical ring network capable of reducing the time required for switching restoration in comparison to the conventional network is provided.

According to one embodiment of the present invention, there is provided a two-fiber optical ring network having a plurality of nodes and first and second fiber optic links for sequentially connecting the nodes, wherein each of the nodes comprising: a first splitting section for splitting protection channels from optical signals traveling through the first fiber optic link; a first add/drop section for performing adding and/or dropping of a channel in the course of demultiplexing and multiplexing the optical signals passing through the first splitting section to a plurality of channels; and, a first switching section for combining the protection channels to the first fiber optic link depending on a control signal when a fiber-optic-link failure between adjacent nodes has not occurred, and for combining the protection channels to the second fiber-optic-link depending on the control signal when a fiber-optic-link failure between adjacent nodes has occurred.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described in detail with reference to the accompanying drawings. For the purposes of clarity and simplicity, a detailed description of known functions and configurations incorporated herein will be omitted as it may make the subject matter of the present invention rather unclear.

Figure 1:
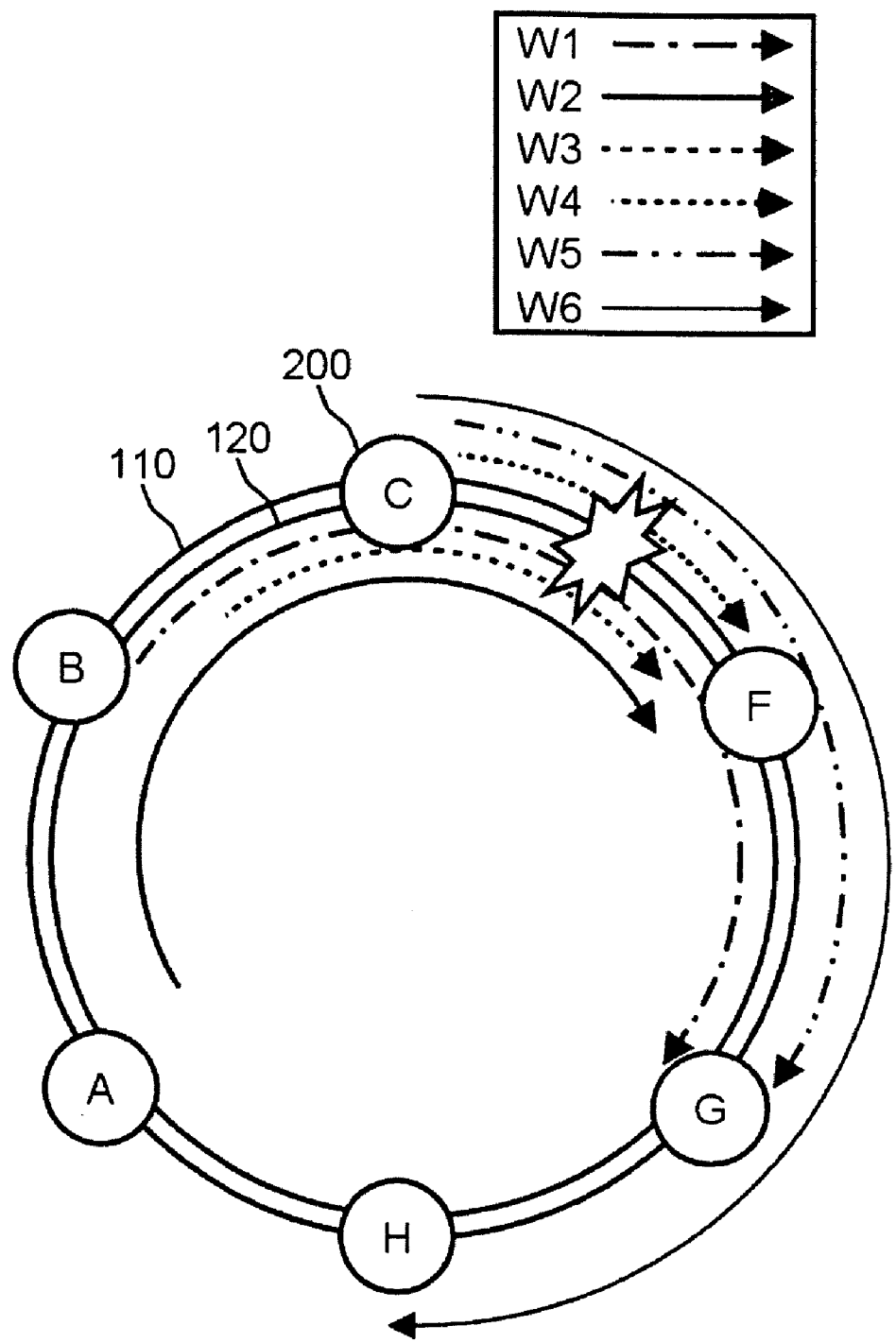
FIG. 1 shows a schematic configuration of a two-fiber optical ring network according to a preferred embodiment of the present invention.

FIG. 1 shows a schematic configuration of a two-fiber optical ring network according to a preferred embodiment of the present invention. As shown, the ring network includes six nodes 200 and first and second fiber optic links 110 and 120 for connecting these six nodes with one another. Although a limited number of nodes is shown in FIG. 1 for illustrative purposes, it is to be understood that the teachings of the present invention can support a much larger number of nodes. Thus, the number of nodes in the drawing should not impose limitations on the scope of the invention.

The ring network is a two-fiber wavelength-division multiplexing (WDM) optical ring network with a clockwise ring structure and a counter-clockwise ring and maintains a full-mesh connectivity with respect to all nodes 200. FIG. 1 shows an optical path of the first fiber optic link 110 which functions as a transmission medium of optical signals traveling in a clockwise direction and an optical path of the second fiber optic link 120 which functions as a transmission medium for optical signals traveling in a counter-clockwise direction. Further, the ring network is configured so that network extension can be performed for additional new nodes, and that a rapid switching restoration can be performed by switching the network links, as explained later.

In operation, when the optical path of the first fiber optic link 110 is set to reverse its two points, i.e., a starting point and a terminating point, the first optical path 110 may become the optical path for the second fiber optic link 120. The clockwise optical path, which starts with node B and terminates at node F, is set to the first fiber optic link 110, the counter-clockwise optical path, which starts with the node F and terminates at node B, is set to the second fiber-optic link 120. Note that the clockwise optical path corresponds to a third wavelength W3 as shown in Table 1.

TABLE 1

|    | A | B | C | F | G | H |
|----|---|---|---|---|---|---|
| W1 | 1 | 3 | X | X | 2 | X |
| W2 | 3 | X | X | 1 | 1 | 1 |
| W3 | X | 2 | X | 2 | X | 2 |
| W4 | 2 | X | 1 | 3 | X | X |
| W5 | X | 1 | 2 | X | 3 | X |
| W6 | X | X | 3 | X | X | 3 |

Table 1 is a matrix showing how the optical path of the first fiber optic link 110 is set in the optical ring network. Note that the optical path, as shown in FIG. 1, which passes the first fiber optic link 110 between node C and node F, is shown on the basis of the above matrix for setting the optical path.

According to the embodiment of the present invention, each fiber-optic link is provided with working channels under a normal condition and protection channels under a switched condition. The following Table 2 represents which wavelength is allocated to two kinds of channels in the ring network.

TABLE 2

| Wavelength | Direction | Channel |
|---|---|---|
| W1 to W16 | Clockwise | Working |
| W17 to W32 | Clockwise | Protection |
| W1 to W16 | Counter-clockwise | Working |
| W17 to W32 | Counter-clockwise | Protection |

As shown in Table 2, wavelengths for the working channels are different from wavelengths for the protection channels. Thus, even when a fiber-optic link switching occurs, i.e., one fiber-optic link is switched with another fiber-optic link so as to reverse transmission directions, it is possible to perform switching restoration without any influence on the existing channel under communication, which will be described in detail below.

Figure 2:
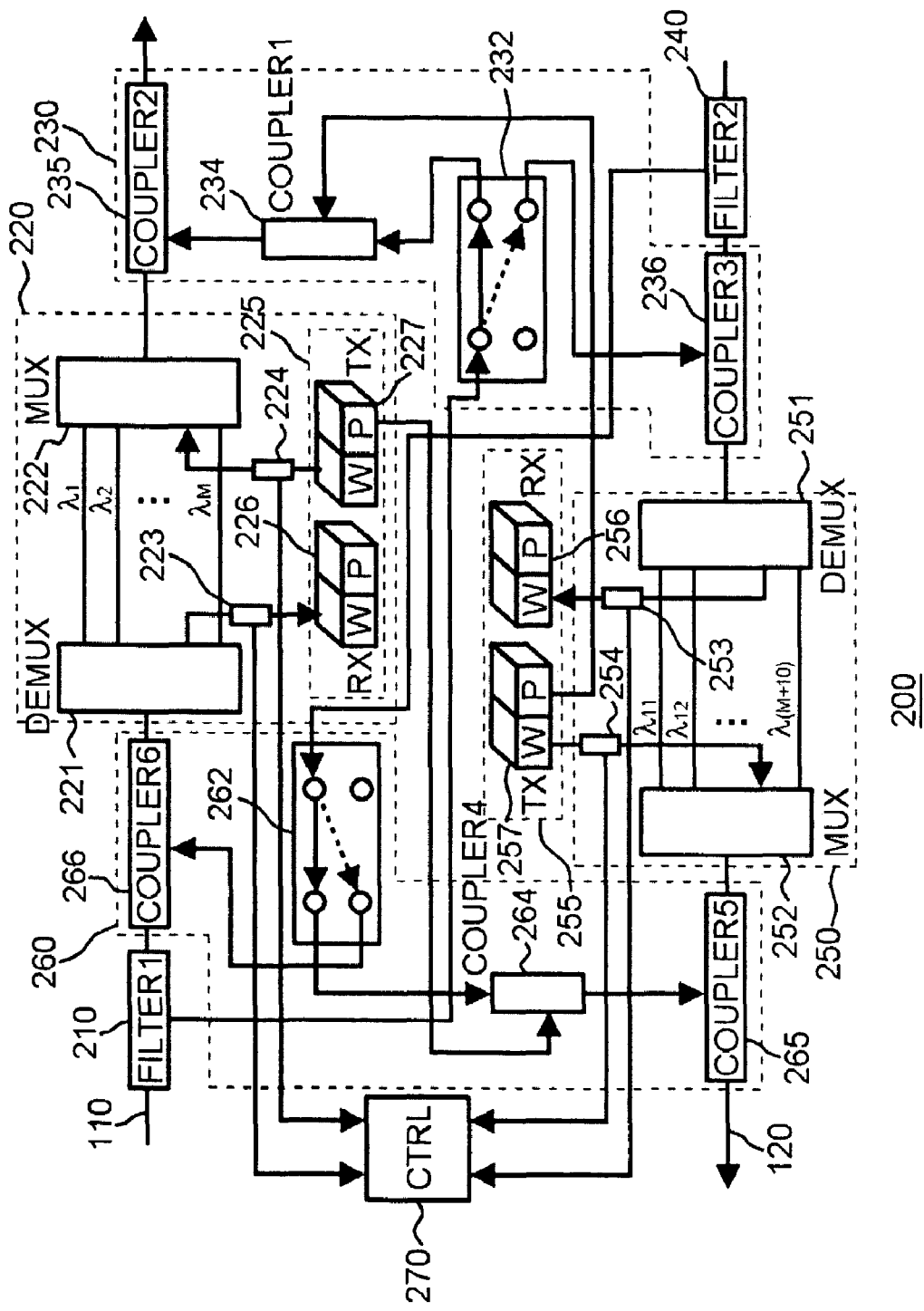
FIG. 2 shows a configuration common to any one of the nodes shown in FIG. 1.

FIG. 2 illustrates a detailed diagram of the components that are representative of any one of nodes shown in FIG. 1. As shown, each node 200 includes first and second splitting sections 210 and 240, first and second add/drop sections 220 and 250, first and second switching sections 230 and 260, and a controlling section 270.

The first splitting section 210 functions to split optical signals traveling through the first fiber optic link 110 into a protection channel. Specifically, the first splitting section 210 is fitted on the first fiber-optic link 110 and severs to provide the protection channel for the optical signals. In an alternate embodiment, the first splitting section 210 may be replaced with an optical filter, such as a band-pass filter, a WDM coupler and so forth.

The first add/drop section 220 performs the adding and/or dropping of a channel during the course of demultiplexing and multiplexing of the optical signals, from which protection channels have been removed through the first splitting section 210. The first add/drop section 220 includes a first demultiplexer 221, first and second tap couplers 223 and 224, a first optical transceiver module 225 having a first optical receiver 226 and a first optical transmitter 227, and a first multiplexer 222.

The first demultiplexer 221 performs the wavelength-division demultiplexing of optical signals that are inputted through the first splitting section 210, then outputs the demultiplexed optical signals to a plurality of channels. In an alternate embodiment, the first demultiplexer 221 may be substituted by an arrayed waveguide grating.

The first optical receiver 226 functions to detect dropped channels among the channels outputted from the first demultiplexer 221. Note that the dropped channels are outputted through a photoelectric conversion process. In an alternate embodiment, the first optical receiver 226 may be substituted by a photodiode.

The first tap coupler 223 is installed on the path between the first demultiplexer 221 and the first optical receiver 226. The first tap coupler 223 splits a part of the channel inputted into the first optical receiver 226 to another split channel. The first optical transmitter 227 outputs channels to be added. In an alternate embodiment, the first optical transmitter 227 may be substituted by a laser diode.

The second tap coupler 224 is installed on the path between the first optical transmitter 227 and the first multiplexer 222, splits a part of the channel outputted from the first optical transmitter 227, and outputs the split channel.

The first multiplexer 222 performs the wavelength-division multiplexing of the channels inputted from the first demultiplexer 221 and the channels inputted from the first optical transmitter 227, then outputs the wavelength-division multiplexed channels.

The first switching section 230 functions to combine the optical signals in protection channels with added/dropped optical signals traveling through the first fiber-optic link 110 when no link failure between adjacent nodes occurs. The first switching section 230 also functions to combine the optical signals in the protection channels with optical signals traveling through the second fiber optic link 120 if a link failure between adjacent nodes has occurred.

The first switching section 230 includes a first switch 232 and first to third couplers 234 to 236. The first switch 232 functions to perform either passing or switching of the signals in the protection channels inputted from the first splitting section 210. The first coupler 234 combines the protection channels passing through the first switch 232 with the optical signals in the protection channels inputted from the other second add/drop section 250, then outputs the combined protection channels. Finally, the second coupler 235 combines the added/dropped optical signals inputted from the first multiplexer 222 and the optical signals in the protection channels inputted from the first coupler 235, and then outputs the combined results.

With continued reference to FIG. 2, the third coupler 236 is installed between the second splitting section 240 and the second add/drop section 250 and configured to combine switched protection channels outputted from the first switch 232 with optical signals outputted from the second splitting section 240.

The second splitting section 240 functions to split the optical signals traveling through the second fiber-optic link 120 into a protection channel. Specifically, the second splitting section 240 is fitted on the second fiber-optic link 120 and provides a protection channel for the optical signals. In an alternate embodiment, the second splitting section 240 may be replaced with an optical filter, such as a band-pass filter, a WDM coupler, etc.

The second add/drop section 250 carries out adding and/or dropping of an channel during the course of demultiplexing and multiplexing optical signals, from which protection channels are removed while optical signals pass through the first splitting section 210. The second add/drop section 250 includes a second demultiplexer 251, third and fourth tap couplers 253 and 254, a second optical transceiver module 255 having a second optical receiver 256 and a second optical transmitter 257, and a second multiplexer 252.

The second demultiplexer 251 performs the wavelength-division demultiplexing of optical signals that are inputted through the second splitting section 240 and outputs the demultiplexed optical signals to a plurality of channels. In an alternate embodiment, the second demultiplexer 251 may be substituted by an array waveguide grating.

The second optical receiver 256 functions to detect dropped channels among the channels outputted from the second demultiplexer 251 and outputs the dropped channels through photoelectric conversion. In an alternate embodiment, the second optical receiver 256 may be substituted by a photodiode.

The third tap coupler 253 is installed on the path between the second demultiplexer 251 and the second optical receiver 256 and functions to split a part of the channel inputted into the second optical receiver 256, then outputs the split channel.

The second optical transmitter 257 outputs channels to be added. In an alternate embodiment, the second optical transmitter 257 may be substituted for, by a laser diode for example.

The fourth tap coupler 254 is installed on the path between the second optical transmitter 257 and the second multiplexer 252 and functions to split a part of the channel outputted from the second optical transmitter 257, then outputs the split channel.

The second multiplexer 252 performs the wavelength-division multiplexing of the channels inputted from the second demultiplexer 251 and of the channels inputted from the second optical transmitter 257 and then outputs the wavelength-division-multiplexed channels.

The second switching section 260 functions to combine the optical signals in the protection channels with added/dropped optical signals traveling through the second fiber-optic link 120 when no link failure between adjacent nodes occurs. The second switching section 260 also functions to combine optical signals in the protection channels with optical signals traveling through the first fiber-optic link 110 if a link failure between adjacent nodes has occurred.

The second switching section 260 includes a second switch 262 and fourth to sixth couplers 264 to 266. The second switch 262 functions to perform either passing or switching of protection channels inputted from the second splitting section 240. The fourth coupler 264 combines the protection channels passing through the second switch 262 with the optical signals in the protection channels inputted from the first add/drop section 220, then outputs the combined protection channels. The fifth coupler 265 combines the added/dropped optical signals inputted from the second multiplexer 252 and the optical signals in the protection channels inputted from the fourth coupler 264, then outputs the combined results. The sixth coupler 266 is installed between the first splitting section 210 and the first add/drop section 220 and combines switched protection channels outputted from the second switch 262 with optical signals outputted from the first splitting section 210.

The controlling section 270 controls the first switch 232, the second switch 262, the first optical transceiver module 225, and the second optical transceiver module 255 so as to identify and restore a failing link. When a failure occurs in a certain link on the ring network, a certain channel involved in the switched link with the failure occurring thereon cannot reach the node in interest. As such, the controlling section 270 identifies the link failure through the first or third tap coupler 223 or 253.

When there is a channel which fails to be transmitted under the influence of the failing link, a loop-back procedure is performed using the protection channels of the first or second optical transmitter 227 or 257. Specifically, the loop-back procedure is performed by outputting the protection channels, outputted from the first or second optical transmitter 227 or 257, to the other fiber-optic link. Here, the optical signals in the protection channels are combined with optical signals traveling through the other fiber-optic link.

When the optical signals reach the next node, the optical signals pass through the first or second splitting section 210 or 240. The first or second splitting section 210 or 240 acts to split the protection channels from the inputted optical signals. The protection channels split in this way are inputted into the first or second switch 232 or 262, and the rest of the optical signals are inputted into the first or second demultiplexer 221 or 251. At this time, the controlling section 270 controls the first or second switch 232 or 262. When the concerned node is not the adjacent node of the switched link, the controlling section 270 causes the first or second switch 232 or 262 to be in a parallel state, thus simply passing the protection channels. However, when the concerned node is the adjacent node of the switched link, the controlling section 270 causes the first or second switch 232 or 262 to be in a cross state, thus performing a feedback of the protection channels to the first or second demultiplexer 221 or 251 which is installed on the other fiber-optic link so that the switching restoration is carried out.

Now, In order to facilitate an understanding of this invention, an exemplary working process of restoring and switching will be described in conjunction with FIGS. 3 and 4.

Figure 3:
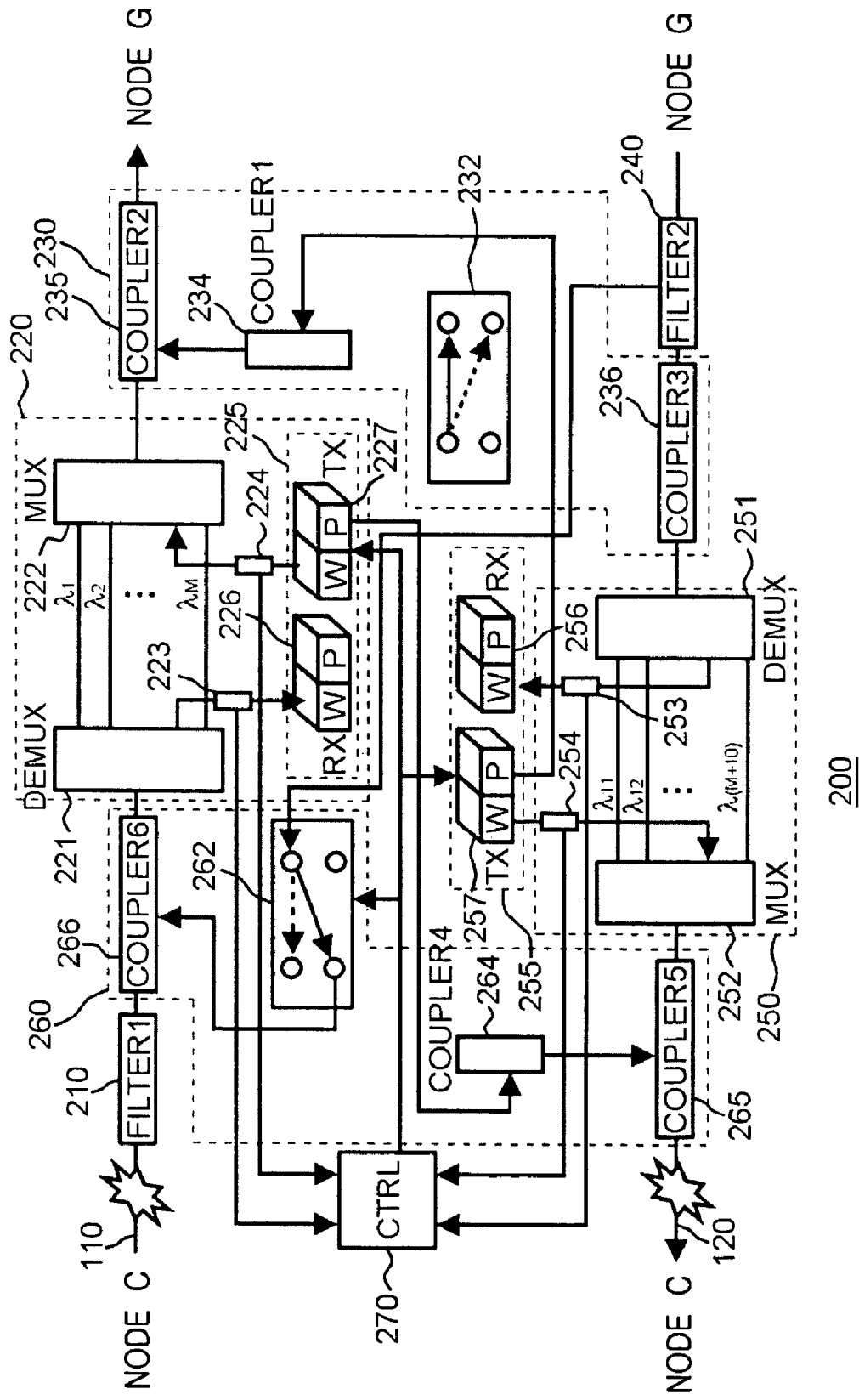
FIG. 3 illustrates a procedure for performing a switching restoration of the node F when a failure occurs in a fiber-optic link between the nodes C and F in the optical fiber network shown in FIG. 1; and, FIG. 4 illustrates operations of the rest of the nodes when a failure occurs in a fiber-optic link between the nodes C and F is switched in the optical fiber network shown in FIG. 1.

FIG. 3 illustrates a procedure of switching restoration of the node F when a failure occurs in an fiber-optic link between the nodes C and F in the optical fiber network shown in FIG. 1. The first optical receiver 226 receives channels dropped by the first demultiplexer 221 before a failure occurs in the fiber-optic link, but not immediately after a failure occurs in the fiber-optic link. The first tap coupler 223 does not split and output the channel after a failure occurs in the fiber-optic link. As such, when the controlling section 270 does not receive optical signals that are split from the first tap coupler 223, the controlling section identifies that the fiber-optic link has filed. The controlling section 270 performs switching restoration consisting of a loop-back procedure and a feed-back procedure as soon as the controlling section identifies the link failure.

In the loop-back procedure, the controlling section 270 outputs a control signal to the second optical transmitter 257, so that the second optical transmitter 257 outputs signals via protection channels. The optical signals in the protection channels pass through the first coupler 234 to be inputted into the second coupler 235. The second coupler 235 combines the protection channels with optical signals inputted from the first multiplexer 222, then outputs the combined results.

In the feedback procedure, the second splitting section 240 splits inputted optical signals into the protection channels. To this end, the controlling section 270 outputs a control signal so as to operate the second switch 262 in a cross state. Then, the optical signals in the protection channels switched by the second switch 262 pass through the sixth coupler 266 to be inputted into the first demultiplexer 221.

Figure 4:
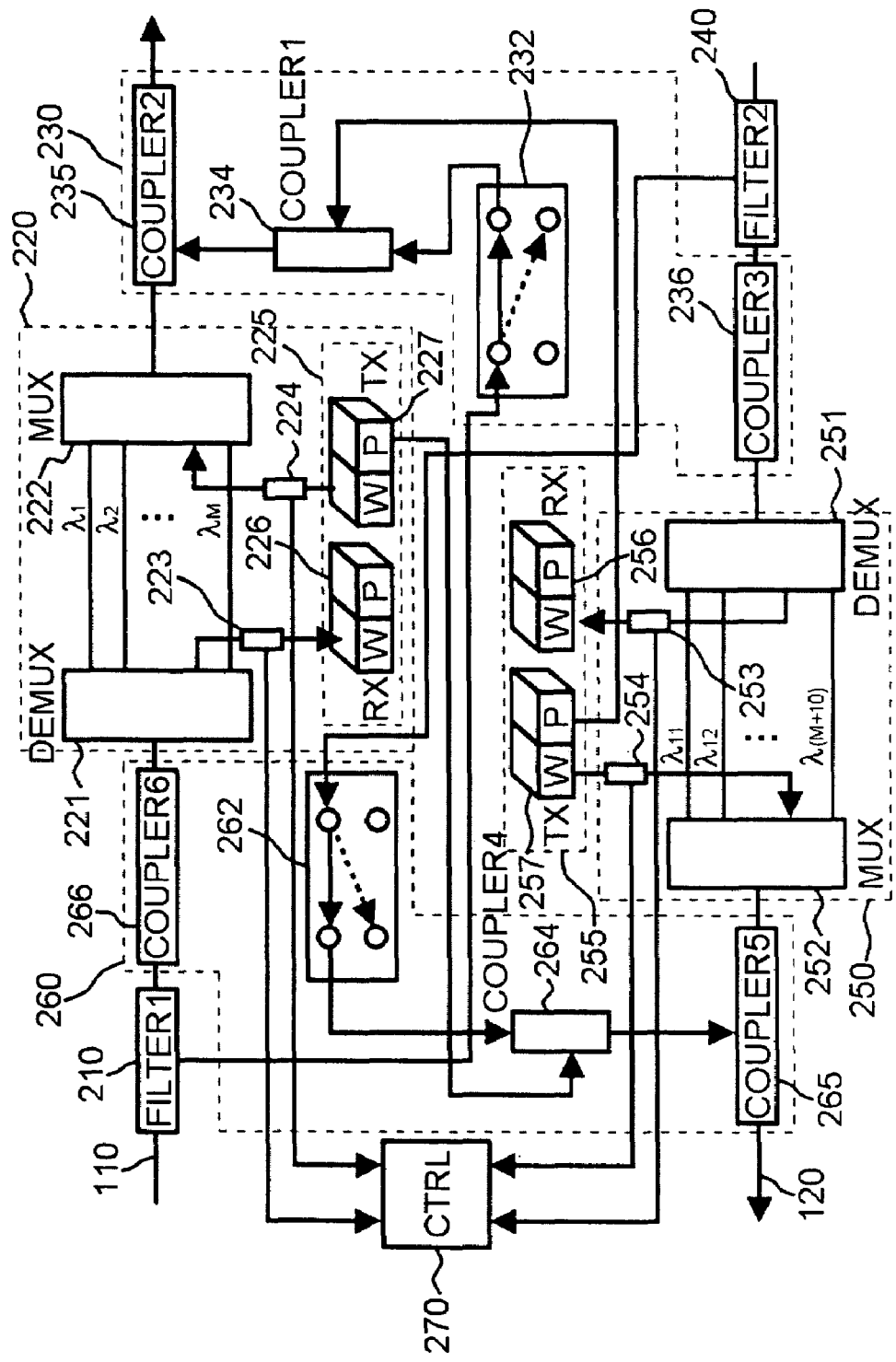

FIG. 4 illustrates operations of the nodes Q H, A, and B when a failure occurs in a fiber-optic link between the nodes C and F in the optical fiber network shown in FIG. 1. The first splitting section 210 splits inputted optical signals into the protection channels and passes the rest of the optical signals there-through. The first switch 232 is in a parallel state, so that the optical signals in the protection channels pass through the first switch 232 and the first coupler 234 to be inputted into the second coupler 235. The second coupler 235 combines the optical signals in the protection channels with optical signals outputted from the first multiplexer 222, then outputs the combined results. Similarly, the optical signals split into the protection channels from the second splitting section 240 pass through the second switch 262 being in a parallel state and the fourth coupler 264, to be inputted into the fifth coupler 265. The fifth coupler 265 combines the optical singles in the protection channels with optical signals outputted from the second multiplexer 252, then outputs the combined results.

As mentioned above, in the optical ring network the protection channels are fed back into the first or second demultiplexer 221 or 251 at the adjacent node of the fiber-optic link that is subjected to link failure, so that the protection channels are each set to have the desired optical path before the switching occurs due to the link failure. It is a function of switching restoration that the WDM optical ring network requires an indispensable function. This switching restoration mechanism provides a means of restoring any fiber-optic link that is broken or problematic. To perform a rapid switching restoration in the ring network, channels that are demultiplexed and dropped are detected using the first or third tap coupler 223 or 253. The dropped channels are outputted to the controlling section 270, which checks whether or not it has received the dropped channels and then identifies the dropped channels. The following Table 3 is a matrix that shows how to set the optical path of a second fiber optic link 120.

TABLE 3

|    | A | B | C | F | G | H |
|----|---|---|---|---|---|---|
| W1 | 2 | 1 | X | X | 3 | X |
| W2 | 1 | X | X | 3 | 1 | 1 |
| W3 | X | 2 | X | 2 | X | 2 |
| W4 | 3 | X | 2 | 1 | X | X |
| W5 | X | 3 | 1 | X | 2 | X |
| W6 | X | X | 3 | X | X | 3 |

As seen from Tables 1 and 3, when any link fails, each node 200 cannot receive some of channels depending on the position of the filed link before switching restoration is performed. As shown in FIG. 2, each node 200 is designed to always check for the light intensity of each channel by providing the first or third tap coupler 223 or 253 to the dropped channel. When this is identified by each channel at any node to determine the failing link, a proper switching can be performed according to the teachings of the present invention. Therefore, when any link fails, this link failure is identified simultaneously at every node 200, and this identification process enables a proper measure to be taken at the concerned node at the same time, thus reducing the time for performing switching restoration as a whole.

As mentioned above, there is an advantage in that the optical ring network according to the present invention saves expenses related to configuring each node by decreasing the number of the wavelength-division multiplexer as in the conventional art. There is another advantage as the number of wavelengths necessary for connecting all nodes in the optical network is less than that of UWPSR(or BWLSR). Further, there is yet another advantage in that the optical ring network enables switching restoration to be rapidly performed by identifying channels that are dropped at the concerned node through a path-setting approach of a BWPSR. Finally, there is still another advantage in that the optical ring network according to the present invention splits multiplexed optical signals inputted through the fiber-optic link into the protection channel and performs either switching of the protection channels or changing of the optical paths, so that the number of channels that a multiplexer and a demultiplxer of the optical add/drop section must process can be decreased.

What is claimed is:

1. A two-fiber optical ring network having a plurality of nodes linked by a first fiber optic link and a second fiber optic link, each of the nodes comprising:

a first splitting section for splitting optical signals received from the first fiber optic link into protection channels and working channels;

a first add/drop section for performing adding and/or dropping —a channel on the working channels received from the first splitting section;

a first switching section for combining —the protection channels received from the first splitting section with the working channels that have been output from the add/drop section when there is no link failure between adjacent nodes and for outputting the protection channels received from the first splitting section to the second fiber optic link when there is a link failure between adjacent nodes; and, a controlling section for identifying whether or not the optical link failure occurs in the first and second fiber optic links and for generating a control signal to activate a restoration process according to the identified outcome, wherein when there is optical link failure only the protection channel is switched to the second link.

2. The node according to claim 1, wherein the first splitting section comprises an optical filter.

3. The node according to claim 1, further comprising:

a second splitting section for splitting optical signals received from the second fiber optic link into the protection channels and working channels;

a second add/drop section for performing adding and/or dropping a channel on the working channels received from the second splitting section; and, a second switching section for combining the protection channels received from the second splitting section with the working channels traveling through the second fiber optic link when there is no link failure between adjacent nodes and for outputting the protection channels received from the second splitting section to the first fiber optic link when there is a link failure between adjacent nodes.

4. The node according to claim 3, wherein the second splitting section comprises an optical filter.

5. The node according to claim 3, wherein the first add/drop section comprises:

a first demultiplexer for performing wavelength-division demultiplexing and outputting demultiplexed signals that are input through the first splitting section;

a first optical receiver for performing a photoelectric conversion with respect to channels dropped from the first demultiplexer and for outputting the converted channels;

a first tap coupler, provided on a path between the first demultiplexer and the first optical receiver, for splitting a part of the channel inputted into the first optical receiver and for outputting the split channel to the controlling section;

a first optical transmitter for outputting channels to be added;

a second tap coupler, provided on a path between the first optical transmitter and the first multiplexer, for splitting a part of the channel outputted from the first optical transmitter and for outputting the split channel to the controlling section; and, a first multiplexer for performing wavelength-division-multiplexing the working channels inputted from the first demultiplexer and the channel from the first optical transmitter and for outputting the multiplexed channels.

6. The node according to claim 5, wherein the first demultiplexer comprises an arrayed waveguide grating.

7. The node according to claim 5, wherein the first optical transmitter comprises a laser diode.

8. The node according to claim 5, wherein the first optical receiver comprises a photodiode.

9. The node according to claim 5, wherein the first switching section comprises:

a first switch for performing passing or switching the protection channels inputted from the first splitting section based on the control signal generated by the controlling section;

a first coupler for combining at its inputs, the protection channels –inputting the first switch with a channel passing through from the output of second add/drop section and for outputting the combined results;

a second coupler for combining at its inputs, the multiplexed channels output from the first multiplexer and the protection channels inputted from the first coupler and for passed through the combined results; and, a third coupler, provided between the second splitting section and the second add/drop section, for combining the protection channels outputted when in the switch state with working channels outputted from the second splitting section.

10. The node according to claim 9, wherein the second add/drop section comprises:

a second demultiplexer for performing wavelength-division demultiplexing and outputting the working channels inputted through the second splitting section;

a second optical receiver for performing a photoelectric conversion with respect to channels dropped from the second demultiplexer and for outputting the converted channels;

a second tap coupler, provided on a path between the second demultiplexer and the second optical receiver, for splitting a part of the channel inputted into the second optical receiver and for outputting the split channel to the controlling section;

a second optical transmitter for outputting a channels to be added;

a fourth tap coupler, provided on a path between the second optical transmitter and the second multiplexer, for splitting a part of the channel outputted from the second optical transmitter and for outputting the split channel to the controlling section; and, a second multiplexer for performing wavelength-division-multiplexing the working channels inputted from the second demultiplexer and the channel from the second optical transmitter and for outputting the multiplexed channels.

11. The node according to claim 10, wherein the second demultiplexer comprises an arrayed waveguide grating.

12. The node according to claim 10, wherein the first optical transmitter comprises a laser diode.

13. The node according to claim 10, wherein the first optical receiver comprises a photodiode.

14. The node according to claim 10, wherein the second switching section comprises:

a second switch for performing passing or switching the protection channels inputted from the second splitting section based on the control signal generated by the controlling section;

a fourth coupler for combining the protection channels inputted from the second switch with channels inputted from the first add/drop section and for outputting the combined results;

a fifth coupler for combining the multiplexed channels inputted from the second multiplexer and the protection channels inputted from the fourth coupler and for outputting the combined results; and, a sixth coupler, provided between the first splitting section and the first add/drop section, for combining the protection channels from the second switch with working channels outputted from the first splitting section.

* * * * *